US010883900B2

(12) United States Patent
Baheti

(10) Patent No.: US 10,883,900 B2
(45) Date of Patent: Jan. 5, 2021

(54) SHAFT ASSEMBLY FOR A HIGH-SPEED TEST RIG

(71) Applicant: Kaydon Ring & Seal, Inc., Baltimore, MD (US)

(72) Inventor: Sanjay Kumar Baheti, Brookeville, MD (US)

(73) Assignee: KAYDON RING & SEAL, INC., Baltimore, MD (US)

(*) Notice: Subject to any disclaimer, the term of this patent is extended or adjusted under 35 U.S.C. 154(b) by 251 days.

(21) Appl. No.: 16/204,383

(22) Filed: Nov. 29, 2018

(65) Prior Publication Data
US 2020/0173886 A1    Jun. 4, 2020

(51) Int. Cl.
| G01M 99/00 | (2011.01) |
| G01M 13/00 | (2019.01) |
| G01M 13/045 | (2019.01) |
| G01M 13/005 | (2019.01) |

(52) U.S. Cl.
CPC .......... *G01M 99/004* (2013.01); *G01M 13/00* (2013.01); *G01M 13/005* (2013.01); *G01M 13/045* (2013.01); *G01N 2203/0222* (2013.01)

(58) Field of Classification Search
CPC ............. G01M 13/025; G01M 13/026; G01M 99/004; G01M 13/04; G01M 13/045
USPC .......................................................... 73/494
See application file for complete search history.

(56) References Cited

U.S. PATENT DOCUMENTS

| 4,694,689 A * | 9/1987 | Kawasaki | G01M 1/04 73/114.77 |
| 5,239,864 A * | 8/1993 | von Pragenau | G01M 13/045 73/112.01 |
| 2002/0112546 A1 * | 8/2002 | Shibasaki | G01M 99/004 73/781 |
| 2014/0033831 A1 * | 2/2014 | Matsumoto | G01L 3/108 73/862.338 |
| 2016/0146681 A1 * | 5/2016 | Sun | G01M 13/005 73/862.191 |

FOREIGN PATENT DOCUMENTS

JP          56162024 A  * 12/1981  ............ G01M 13/04

OTHER PUBLICATIONS

Hall, Thesis: Design and Operation of a High-Speed Test Facility for Rotating Face Seals (Year: 1960).*
Quadratec Limited, High Speed Bearing Rig Design (Year: 2016).*
Quadratec Limited, High Speed Gas Seal Test Rig (Year: 2016).*
Quadratec Limited, High Speed Rotor Spin Test Rig (Year: 2016).*
Quadratec Limited, High Speed Temperature & Pressure Seal Rig (Year: 2016).*

* cited by examiner

*Primary Examiner* — David L Singer
(74) *Attorney, Agent, or Firm* — J-Tek Law PLLC; Scott T. Wakeman; Mark A. Ussai

(57) ABSTRACT

A high-speed test rig is for rotationally testing articles such as seals, bearings, couplers, etcetera. The test rig includes a shaft extension sized to receive a test article annular body about an outer surface and a primary shaft including of a solid rod. The rod has two outer circumferential base surface sections each having an outside diameter and disposed within a separate bearing such that the shaft assembly is rotatable about an axis. The rod has a first end coupled with the shaft extension, such that a cantilever beam is defined between the shaft extension outer end and a first bearing, and a second end coupled with a motor shaft.

20 Claims, 12 Drawing Sheets

SHAFT ASSEMBLY FOR A HIGH-SPEED TEST RIG

BACKGROUND OF THE INVENTION

The present invention relates to rotatable shafts, and more particularly shaft assemblies for test rigs.

Test rigs for testing articles such as seals, bearings, couplers, etc. are known and generally include a shaft assembly. One or more test articles are either disposed about, or mounted upon, a main shaft or a shaft extension. The shaft is driven by a motor, directly or through a gear train, to rotate about a central axis at a desired speed for testing. Measurements of the test article are taken during rotation, such as temperature, strain, vibration, etc. Due to the limitations of current designs, the testing rotational speeds are typically limited to no greater than thirty thousand rotations per minute (30,000 rpm) to ensure that the shaft assembly remains below the bending critical speed in order to avoid destruction of the shaft.

SUMMARY OF THE INVENTION

In one aspect, the present invention is a high-speed test rig for testing articles at rotational speeds between thirty thousand rotations per minute (30,000 rpm) and forty-two thousand, two hundred twelve rotations per minute (42,212 rpm), each test article including a generally annular body. The test rig comprises a housing and first and second bearings disposed within the housing and spaced apart along a central axis. A shaft extension has a centerline, opposing first and second axial ends spaced apart along the centerline and an outer circumferential surface, the shaft extension being sized to receive the test article annular body about the extension outer surface. A primary shaft includes a solid rod formed of a material having a specific modulus with a value greater than twenty million. The rod has opposing first and second axial ends and first and second outer circumferential base surface sections, at least a portion of the first base surface section being disposed within the first bearing and at least a portion of the second base surface section being disposed within the second bearing such that the primary shaft is rotatable about the central axis. The rod first axial end is configured to couple the shaft extension first axial end with the primary shaft such that the extension centerline is coincident with the central axis and a cantilever beam is defined between the shaft extension second axial end and the first bearing. The rod second axial end is configured to couple to a motor shaft with the primary shaft. Further, the rod has an overall axial length between the rod first and second axial ends and the first and second base outer surface sections each having an outside diameter equal to or lesser than any other outer surface section of the rod. The rod is sized such that a ratio of the base surface section outside diameter to the rod axial length is between about 0.12 and 0.16.

In another aspect, the present invention is a shaft assembly for a high-speed test rig for testing articles at rotational speeds between thirty thousand rotations per minute (30,000 rpm) and forty-two thousand, two hundred twelve rotations per minute (42,212 rpm), each test article including a generally annular body. The rig includes a housing and first and second bearings disposed within the housing and spaced apart along a central axis. The shaft assembly comprises a shaft extension having a centerline, opposing first and second axial ends spaced apart along the centerline and an outer circumferential surface, the shaft extension being sized to receive the test seal annular body about the extension outer surface. A primary shaft includes a solid rod having opposing first and second axial ends, a first base outer circumferential surface section disposed within the first bearing and a second base outer circumferential surface section disposed within the second bearing such that the primary shaft is rotatable about the central axis and a central collar portion with an outer circumferential surface and opposing first and second radial end surfaces. The first and second collar end surfaces are engageable by a separate one of two thrust bearings. The rod first axial end is configured to couple the shaft extension first axial end with the primary shaft such that the extension centerline is coincident with the central axis and a cantilever beam is defined between the shaft extension second axial end and the first bearing. The rod second axial end is configured to couple a motor shaft with the primary shaft. Further, the rod has an overall axial length between the rod first and second axial ends, the first and second base outer surface sections each have an outside diameter equal to or lesser than any other outer surface section of the rod, the collar has an axial length between the two collar end surfaces, and the collar outer surface section has an outside diameter. Furthermore, the rod is sized such that a ratio of the base surface section outside diameter to the rod axial length is between about 0.12 and 0.16, the collar is sized such that a ratio of the collar outside diameter to the base surface section outside diameter is between about 2.0 and about 2.3 and a ratio of the collar length to the rod overall length is between about 0.12 and about 0.16.

BRIEF DESCRIPTION OF THE SEVERAL VIEWS OF THE DRAWINGS

The foregoing summary, as well as the detailed description of the preferred embodiments of the present invention, will be better understood when read in conjunction with the appended drawings. For the purpose of illustrating the invention, there is shown in the drawings, which are diagrammatic, embodiments that are presently preferred. It should be understood, however, that the present invention is not limited to the precise arrangements and instrumentalities shown. In the drawings.

DETAILED DESCRIPTION OF THE INVENTION

Certain terminology is used in the following description for convenience only and is not limiting. The words "inner", "inwardly" and "outer", "outwardly" refer to directions toward and away from, respectively, a designated centerline or a geometric center of an element being described, the particular meaning being readily apparent from the context of the description. Further, as used herein, the words "connected" and "coupled" are each intended to include direct connections between two members without any other members interposed therebetween and indirect connections between members in which one or more other members are interposed therebetween. The terminology includes the words specifically mentioned above, derivatives thereof, and words of similar import.

Figure 1:
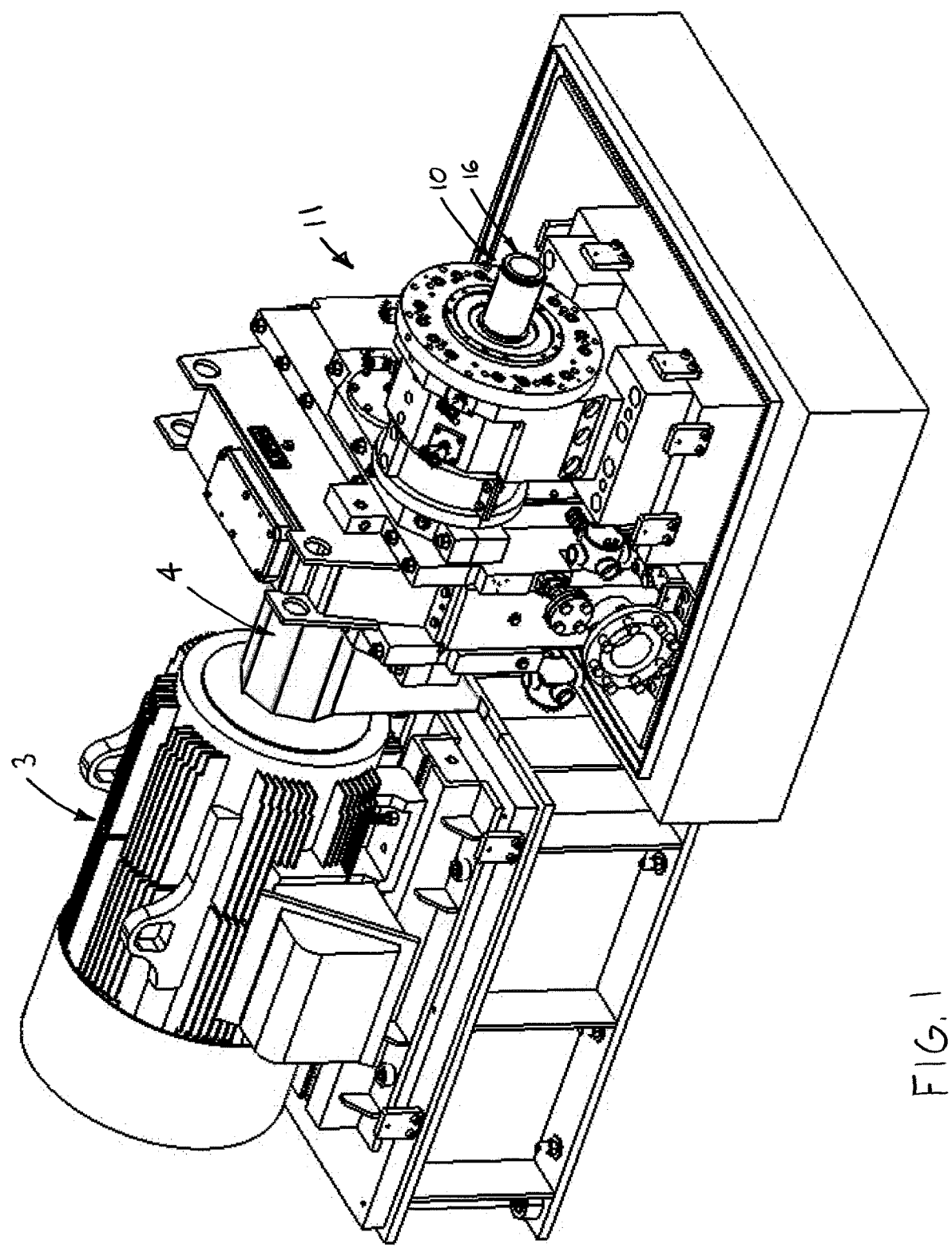
FIG. 1 is a perspective view of a test rig with a shaft assembly in accordance with the present invention.
Figure 2:
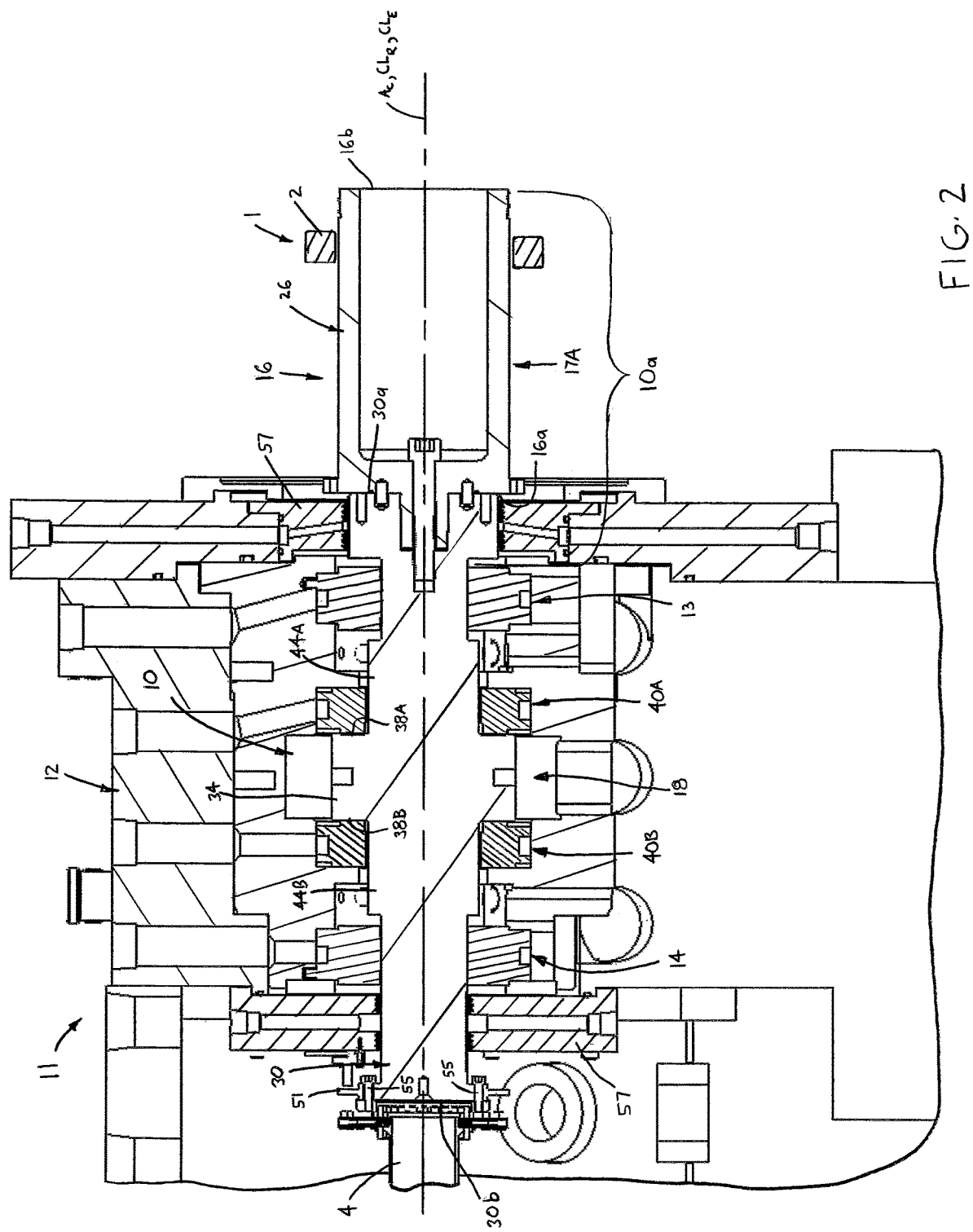
FIG. 2 is a broken-away, axial cross-sectional view of a portion of the test rig, shown with a first shaft extension.
Figure 3:
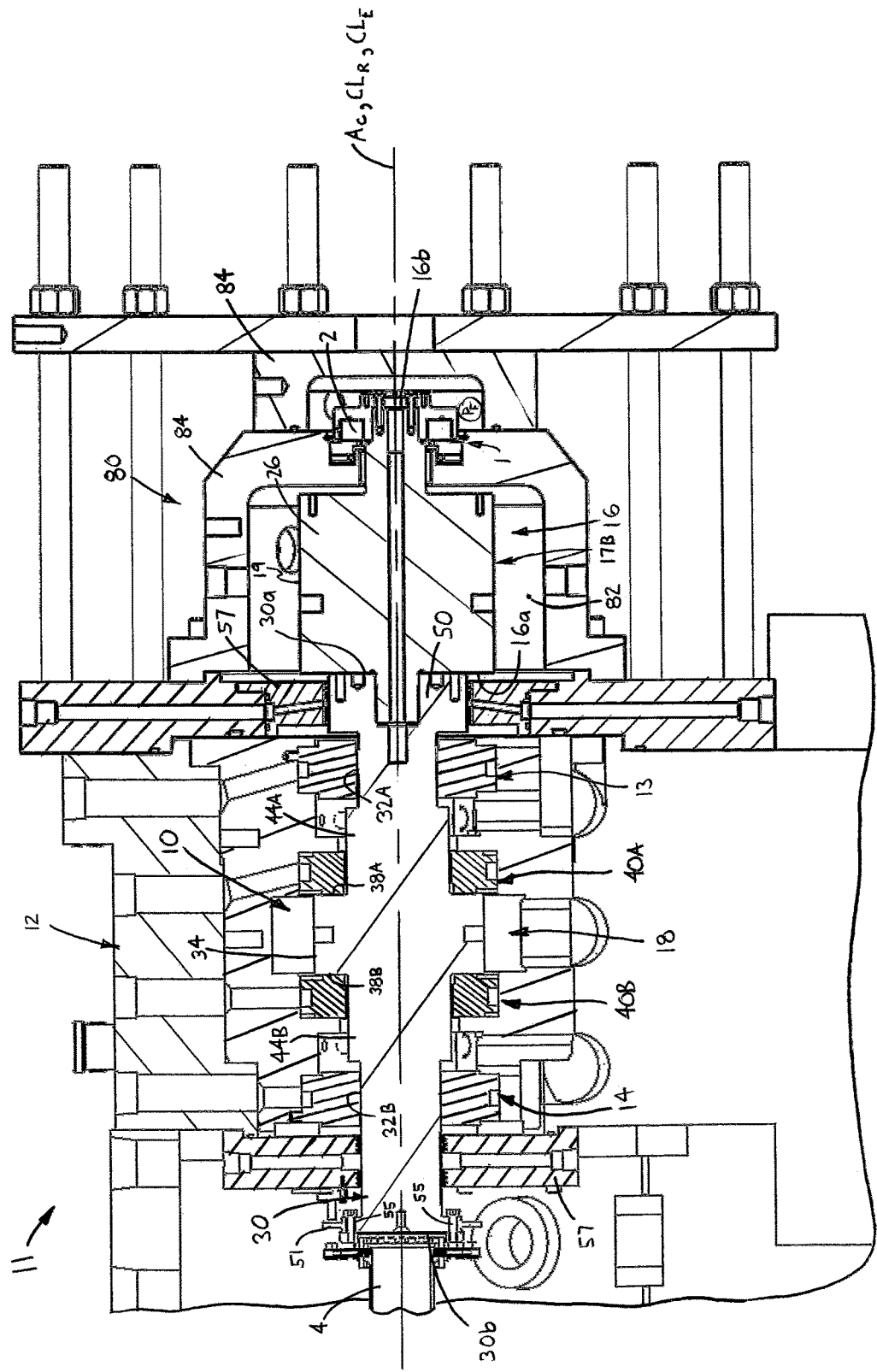
FIG. 3 is a broken-away, axial cross-sectional view of the portion of the test rig, shown with a second shaft extension.
Figure 4:
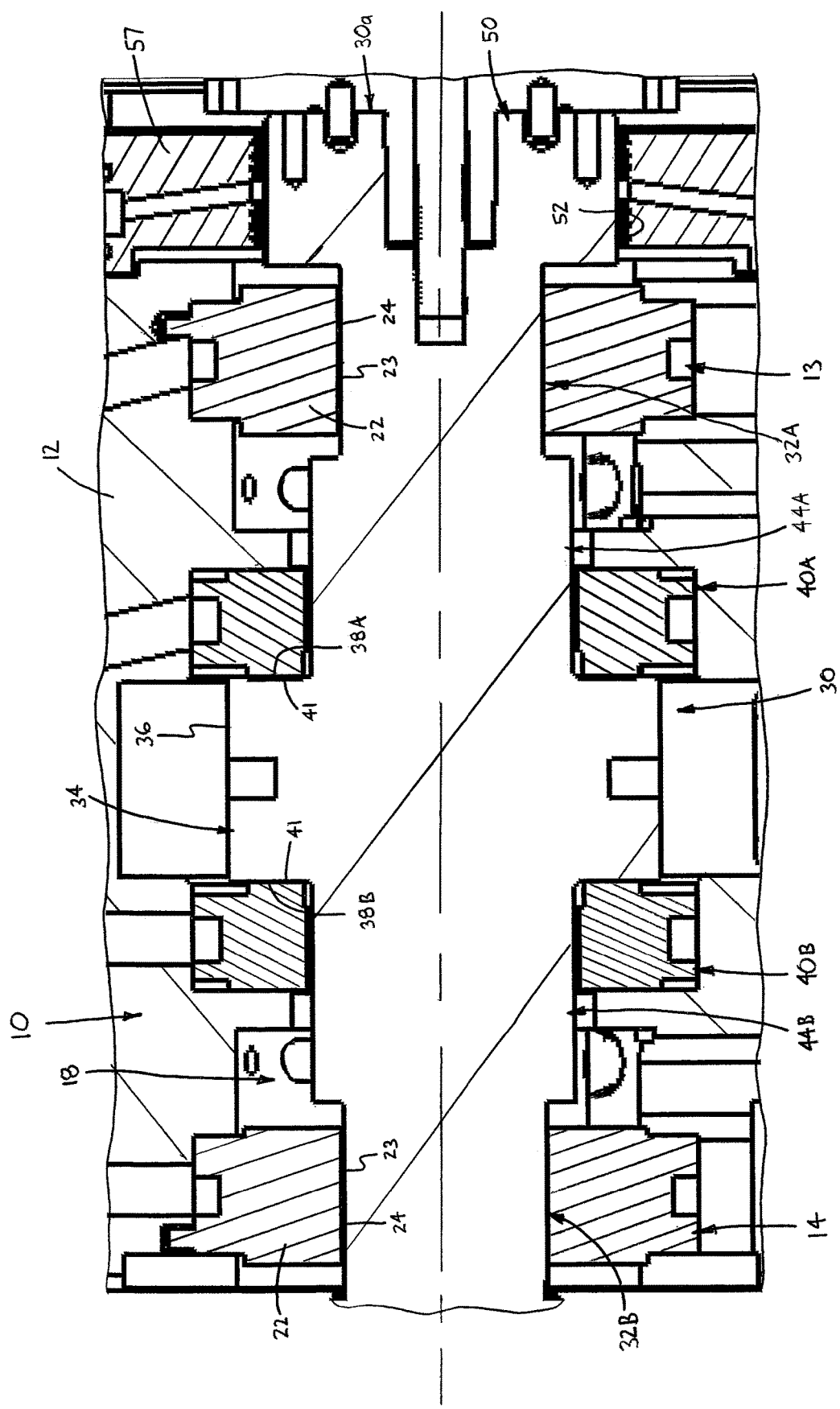
FIG. 4 is an enlarged view of a central portion of the test rig of FIG. 2.

Referring now to the drawings in detail, wherein like numbers are used to indicate like elements throughout, there is shown in FIGS. 1-12 a shaft assembly 10 for a high-speed test rig 11 for testing articles 1 at relatively high rotational speeds between thirty thousand rotations per minute (30,000 rpm) and forty-two thousand two hundred twelve rotations per minute (42,212 rpm), or even higher speeds if desired. Such test articles 1 include seals, bearings, couplers, or any other appropriate mechanical device, each test article 1 including a generally annular body 2. The test rig 11 basically comprises a housing 12, first and second bearings 13, 14, and the shaft assembly 10, which includes a shaft extension 16 and a primary shaft 18 rotatably disposed within the bearings 12, 14 and supporting the shaft extension 16. The first and second bearings 12, 14 are disposed within the housing 12 and are spaced apart along a central axis $A_C$. Each bearing 13, 14 is preferably a journal bearing, most preferably a tilting pad journal bearing including an annular metallic body 22 having an inner circumferential surface 23 and an annular Babbitt layer 24 disposed on the metallic body inner surface 23, as indicated in FIG. 4. The particular shaft extension 16 is preferably selected from at least two and preferably numerous different shaft extensions 16, which vary in size diametrically, axially, or/and axial cross-sectional profile, as discussed below. Each shaft extension 16 preferably includes a circular cylindrical or tubular body 26 and has a centerline $CL_E$, opposing first and second axial ends 16a, 16b spaced apart along the centerline $CL_E$ and an outer circumferential surface 19. Further, each shaft extension 16 is sized to receive the test article annular body 2 about the extension outer surface 19 and is preferably formed so that the combined weight of the shaft extension 16, the test article 1 and any other components on the extension 16 (i.e., the total weight supported by the primary shaft 18) is at least ten pounds (10 lbs.) and preferably up to twenty-five pounds (25 lbs.).

Figure 9:
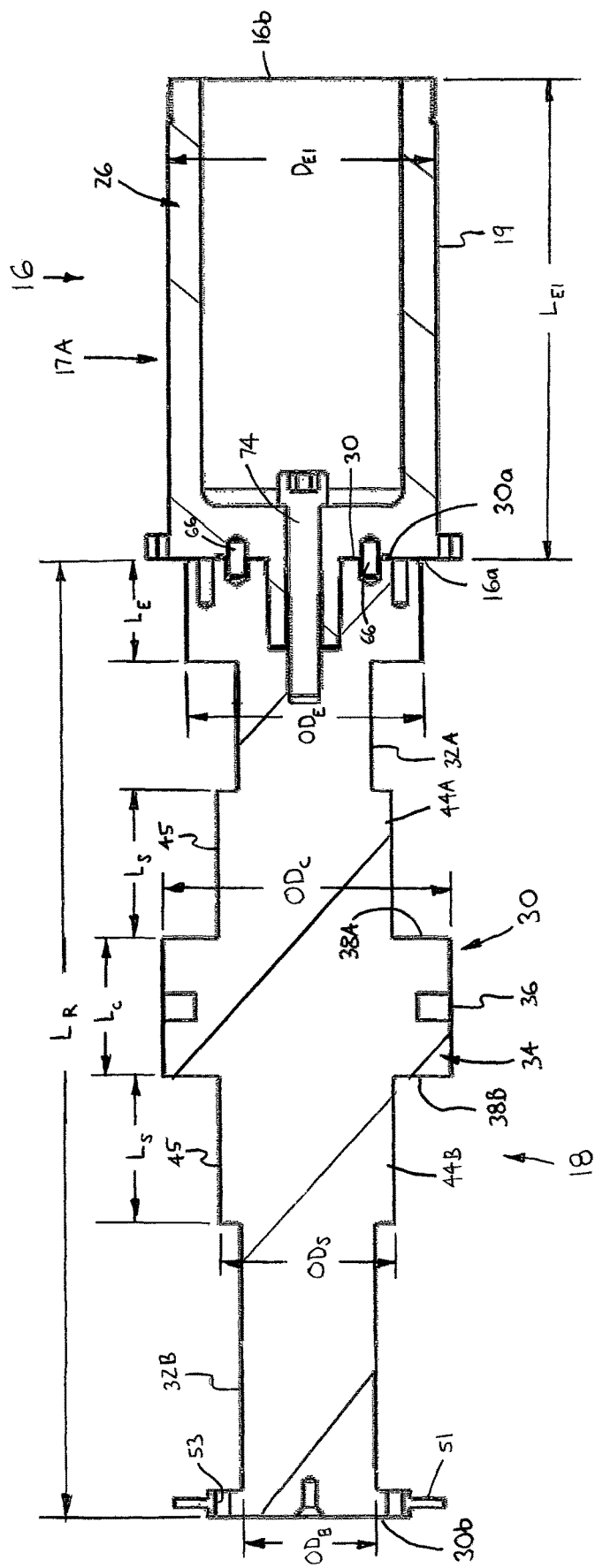
FIG. 9 is an axial cross-sectional view of the shaft assembly of FIG. 8.
Figure 10:
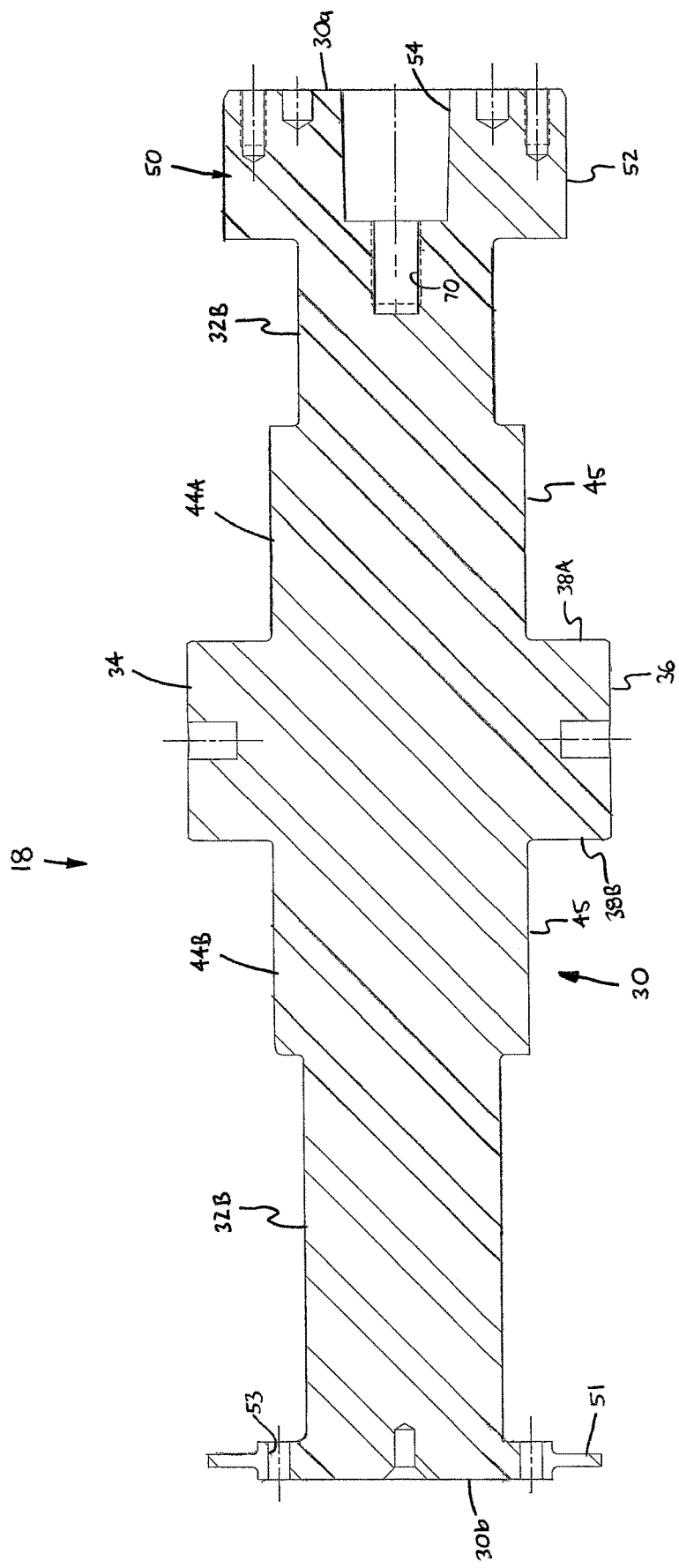
FIG. 10 is an axial cross-sectional view of a rod of a primary shaft.
Figure 11:
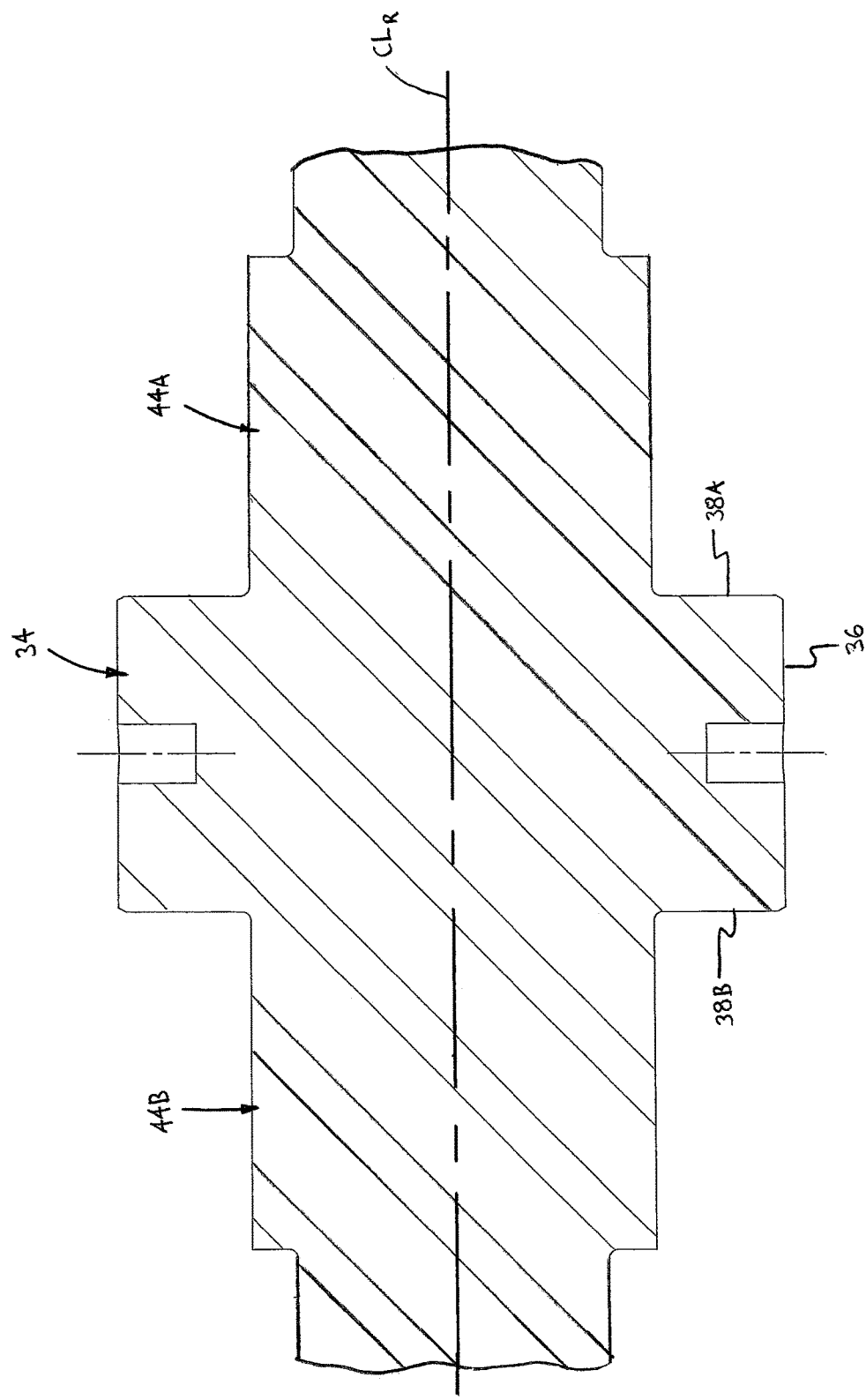
FIG. 11 is a broken-away, enlarged view of a central portion of FIG. 10.

Furthermore, the primary shaft 18 includes a solid rod 30 formed of a material having a specific modulus with a value greater than twenty million meters per seconds$^2$ (m$^2$/s$^2$), preferably between twenty million m$^2$/s$^2$ and thirty-five million m$^2$/s$^2$, as discussed in further detail below, and is most preferably alloy steel or titanium. The rod 30 has opposing first and second axial ends 30a, 30b, first and second outer circumferential base surface sections 32A, 32B each having an outside diameter $OD_B$, and an overall axial length $L_R$, as indicated in FIG. 9. At least a portion of the first base surface section 32A is disposed within the first bearing 13 and at least a portion of the second base surface section 32B is disposed within the second bearing 14, such that the primary shaft is rotatable about the central axis $A_C$. Further, the rod first axial end 30a is configured to couple the shaft extension first axial end 16a with the primary shaft 18 such that the extension centerline $CL_E$ is coincident with the central axis $A_C$ and a cantilever beam section 10a (FIG. 2) is defined between the shaft extension second axial "free" end 16b and the first bearing 13. Due to the relatively substantial length (e.g., 50% or greater of the rod overall length) and weight of the cantilever beam section 10a of the shaft assembly 10 as depicted and described herein, relatively large bending stresses are generated in the shaft rod 30 within the region/portion at which the beam section 10a initially extends outwardly from the first bearing 13, and relatively substantial radial displacement may occur at the extension free end 16b, both of which must be supported by the shaft assembly 10 during high speed rotation. Further, the rod second axial end 30b is configured to couple a motor shaft of a drive motor 3 with the primary shaft 18, such that the motor 3 drives the primary shaft 18 and the shaft extension 16 to angularly displace or rotate about the central axis $A_C$.

The shaft assembly 10 is configured, specifically through material selection and precise determination of the various dimensions of the primary shaft rod 30, to have a bending critical speed greater than forty-eight thousand rotations per minute (48,000 rpm), and preferably greater than fifty-five thousand rotations per minute (55,000 rpm), so as to provide a sufficient factor of safety to operate the shaft assembly 10 at the desired rotational speeds discussed above. As is known by those skilled in the art of rotational dynamics, the bending critical speed of a rotating shaft is the speed at which the shaft reaches its bending natural frequency, which will cause resonance and excessive vibration, particularly in an overhung portion (e.g., the cantilever section 10a), and typically leads to catastrophic failure of the shaft and/or supporting or associated structure such as bearings, motor shafts attached to the shaft, etc. The bending critical speed is dependent on such factors as material elastic modulus, material density, rotational stiffness, etc., and is affected by loading on the shaft, such as from an overhung weight (e.g., mass of shaft extension 16). In particular, the stiffness of a shaft is determined by the structure or physical dimensions of all of the rotating components, in this case, the primary shaft rod 30 and the shaft extension 16.

In view of the above, the specific physical structure of the rod 30 was selected to achieve a desired stiffness of shaft assembly 10, that when combined with a variety of different sized shaft extensions 16, will always result in a bending critical speed above 48,000 rpm and preferably over 55,000 rpm. First, it was believed that sizing the rod 30 such that a ratio of the base surface section outside diameter $OD_B$ to the rod axial length $L_R$ is between about 0.12 (e.g., 0.118, 0.12 or 0.125) and about 0.16 (e.g., 0.158, 0.16 or 0.165), and preferably about 0.14, provides a desired stiffness of the rod 30. For example, when sizing the primary shaft rod 30 at a most preferred value of the ratio $OD_B/L_R$ at 0.143, the bending critical speed is about 60,000 rpm. When varying the rod dimensions such that $OD_B/L_R$ has a value of 0.12, the bending critical speed is reduced to 52,000 rpm and at a value of 0.1 for the ratio of $OD_B/L_R$, the bending critical speed is further reduced to 44,000 rpm.

As it is desired to examine test articles 1 under pressure, such that the shaft assembly 10 is subjected to axial thrust loading, the rod 30 preferably has a generally central collar portion 34 with an outer circumferential surface 36 and opposing first and second radial end surfaces 38A, 38B. The collar portion 34 has an axial length $L_C$ between the two end surfaces 38A, 38B and the collar outer surface section 36 has an outside diameter $OD_C$, as indicated in FIG. 9. Further, the test rig 11 preferably further comprises first and second thrust bearings 40A, 40B and the first and second collar end surfaces 38A, 38B are operatively engageable by a separate one of two thrust bearings 40A, 40B so as to support axial loading on the rod 30. Preferably, each one of the first and second thrust bearings 40A, 40B is a tilt pad bearing including a plurality of pads (not shown) formed of a polymeric material and disposed on one axial face 41 of each bearing 40A, 40B, as best shown in FIG. 4. The thrust bearings 40A, 40B are located such that the collar end surfaces 38A, 38B slide upon an oil film between the surfaces 38A, 38B and the pads.

In any case, with the preferred rod structure including a collar portion 34, the collar portion 34 is preferably sized such that a ratio of the collar outside diameter $OD_C$ to the base surface section outside diameter $OD_B$ is between about 2.0 and about 2.3, preferably about 2.15, and a ratio of the collar length $L_C$ to the rod overall length $L_R$ is between about 0.12 and about 0.16, preferably about 0.14. Such relative dimensioning of the collar portion 34 in relation to the remainder of the rod 30 contributes to achieving the desired rod stiffness.

To further improve the dynamic characteristics of the rod 30 having a central collar portion 34, the rod 30 is preferably provided with first and second stepped portions 44A, 44B each located between the collar portion 34 and a separate one of the first and second base surface sections 32A, 32B. As indicated in FIG. 9, each stepped portion 44A, 44B has an axial length $L_S$ and an outer circumferential surface 45 with an outside diameter $OD_S$, the length $L_S$ and the outside diameter $OD_S$ of each stepped portion 44A, 44B having a value that is substantially equal to the same dimensions $L_S$, $OD_S$ of the other stepped portion 44A, 44B. Further, each stepped portion outside diameter $OD_S$ is greater than the base surface section outside diameter $OD_B$ and lesser than the collar portion outside diameter $OD_C$, as best shown in FIG. 9.

To contribute to achieving the desired stiffness of the rod 30, the rod stepped portions 44A, 44B are each sized such that a ratio of the stepped portion length $L_S$ to the rod length $L_R$ is between about 0.13 and about 0.17, and preferably about 0.15. Additionally, a ratio of the stepped portion outside diameter $OD_S$ to the base surface section outside diameter $OD_B$ is between about 1.1 and about 1.5, and preferably about 1.3.

Referring now to FIGS. 2, 3, 5-10 and 12, the rod 30 preferably includes an enlarged end portion 50 providing the first axial end 30a, which is configured to provide a preferred interface with each shaft extension 16, and an opposing coupling flange 51 at the opposing second end 30b to couple the rod 30 with the motor 3. The coupling flange 51 is generally annular, extends radially outwardly from rod second end 30b and has a plurality of through holes 53 for receiving fasteners 55 to couple the flange 51 with an output member 4 from a gear train, and thereby the shaft assembly 10 to the motor 3, as indicated in FIGS. 2, 3, 9 and 10. The mounting flange 51 has a relatively minimal outside diameter and axial thickness (neither indicated) so as to reduce the effects of the flange 51 on the dynamic characteristics of the shaft assembly 10, particularly in comparison to the opposing end portion 50.

As indicated in FIG. 9, the enlarged end portion 50 has an axial length $L_E$ and an outer circumferential surface 52 with an outside diameter $OD_E$, which is preferably engageable by an annular labyrinth seal 57 to prevent oil flow from the journal bearing 13 toward the test article 1. To achieve desired dynamic characteristics, the end portion 50 is preferably sized such that a ratio of the end portion outside diameter $OD_E$ to the base surface section outside diameter $OD_B$ is between about 1.6 and about 1.9, preferably about 1.75, and a ratio of the end portion axial length $L_E$ to the rod overall length $L_R$ is between about 0.09 and about 0.13, and preferably about 0.11.

Figure 6:
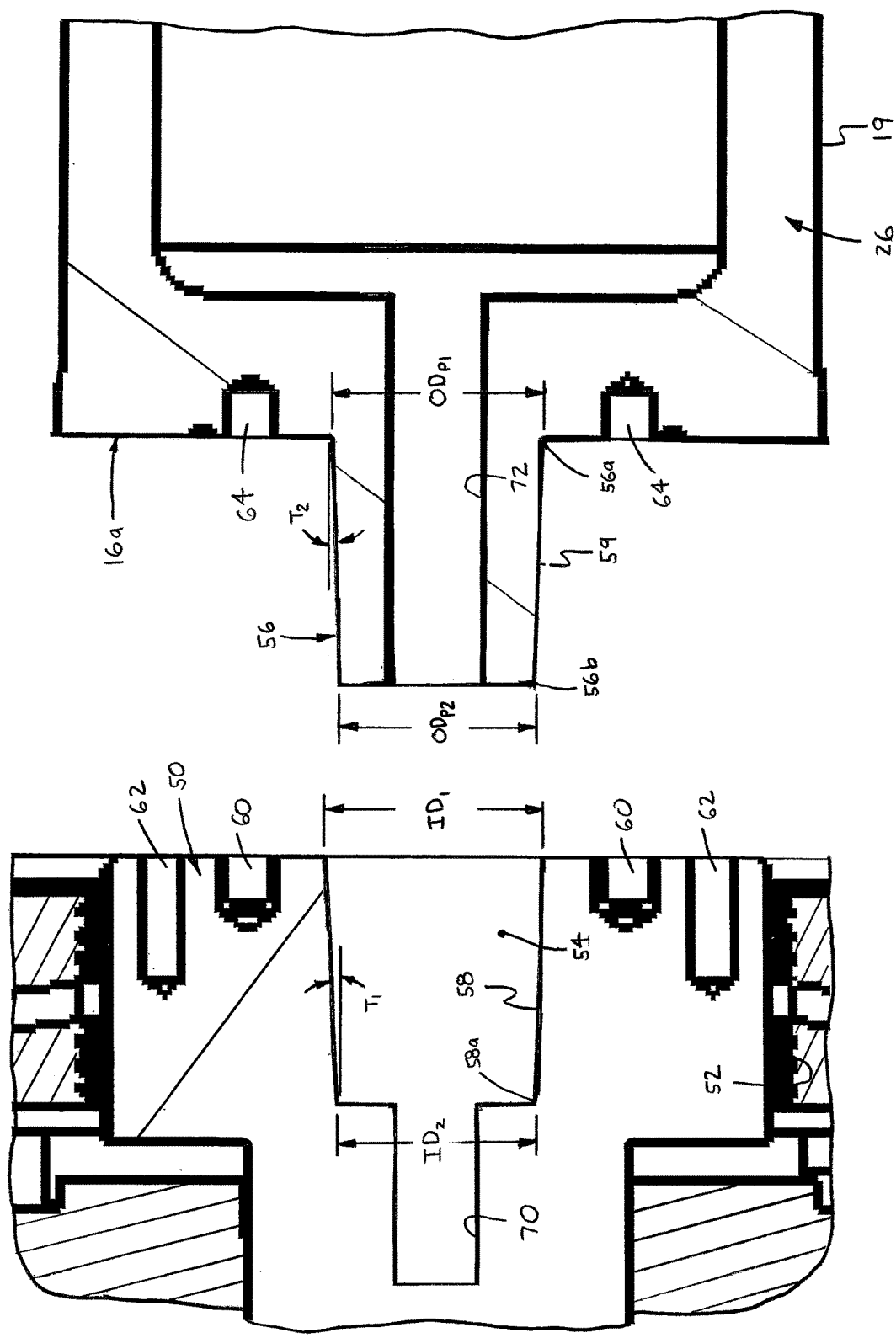
FIG. 6 is a greatly enlarged view of a portion of FIG. 5, shown with the shaft extension spaced from the rod end portion.
Figure 12:
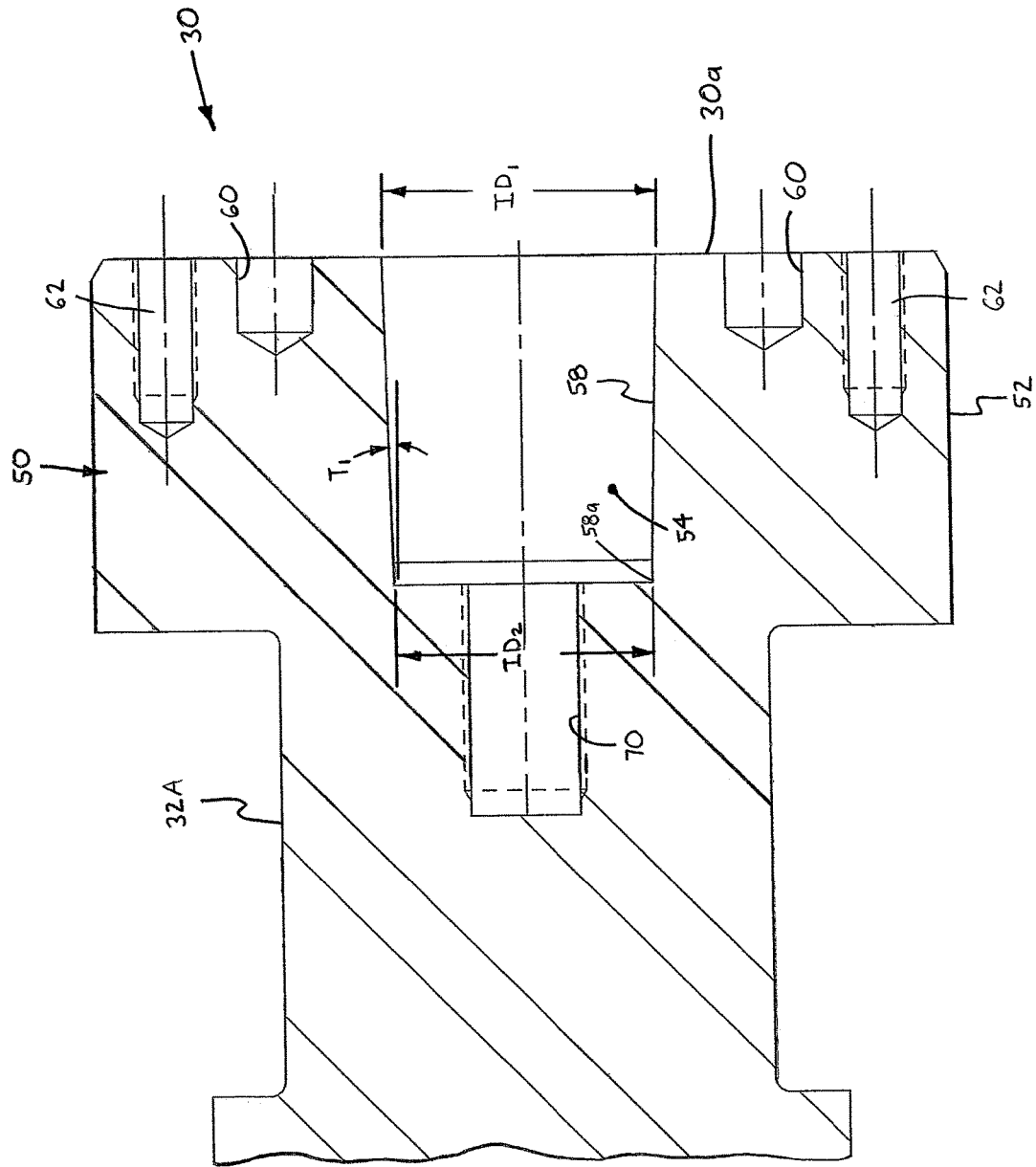
FIG. 12 is a broken-away, enlarged view of an end portion of FIG. 10.

Furthermore, to ensure concentricity between the rod 30 and the shaft extension 16, the two components 30, 14 are provided with a complementary, mating tapered opening 54 and tapered projection 56, respectively. Specifically, the rod 30 includes a tapered inner circumferential surface 58 extending axially inwardly from the first axial end 30a and centered about the rod centerline $CL_R$ so as to define the generally conical central opening 54. The inner circumferential surface 58 has a first inside diameter $ID_1$ at the rod first axial end 30a and a second inside diameter $ID_2$ at an inner end 58a of the inner surface 58, as indicated in FIGS. 6 and 12. The rod inner surface 54 tapers continuously between the first and second inside diameters $ID_1$, $ID_2$ so as to define a first taper angle $T_1$. Additionally, the tapered projection 56 of the shaft extension 16 extends axially outwardly from the extension first axial end 16a and is centered about the extension centerline $CL_E$. The central projection 56 has an inner end 56a integrally formed with the shaft extension and having a first outside diameter $OD_{P1}$ and a second, free end 56b with a second outside diameter $OD_{P2}$. The extension projection 56 has an outer surface 59 tapering substantially continuously between the first and second diameters $OD_{P1}$, $OD_{P2}$ so as to define a second taper angle $T_2$ substantially equal to the first taper angle $T_1$. Thus, when the extension projection 56 is disposed within the rod opening 54, the mating of the complementary outer and inner surfaces 58, 59 substantially centers the shaft extension 16 about the rod centerline $CL_R$ and the central axis $A_C$. Preferably, each of the tapered inner circumferential surface 58 of the rod 30 and the tapered outer surface 59 of the projection 56 has a slope of a number four (#4) Jacobs taper, as is known by those of skill in the machining arts.

Figure 5:
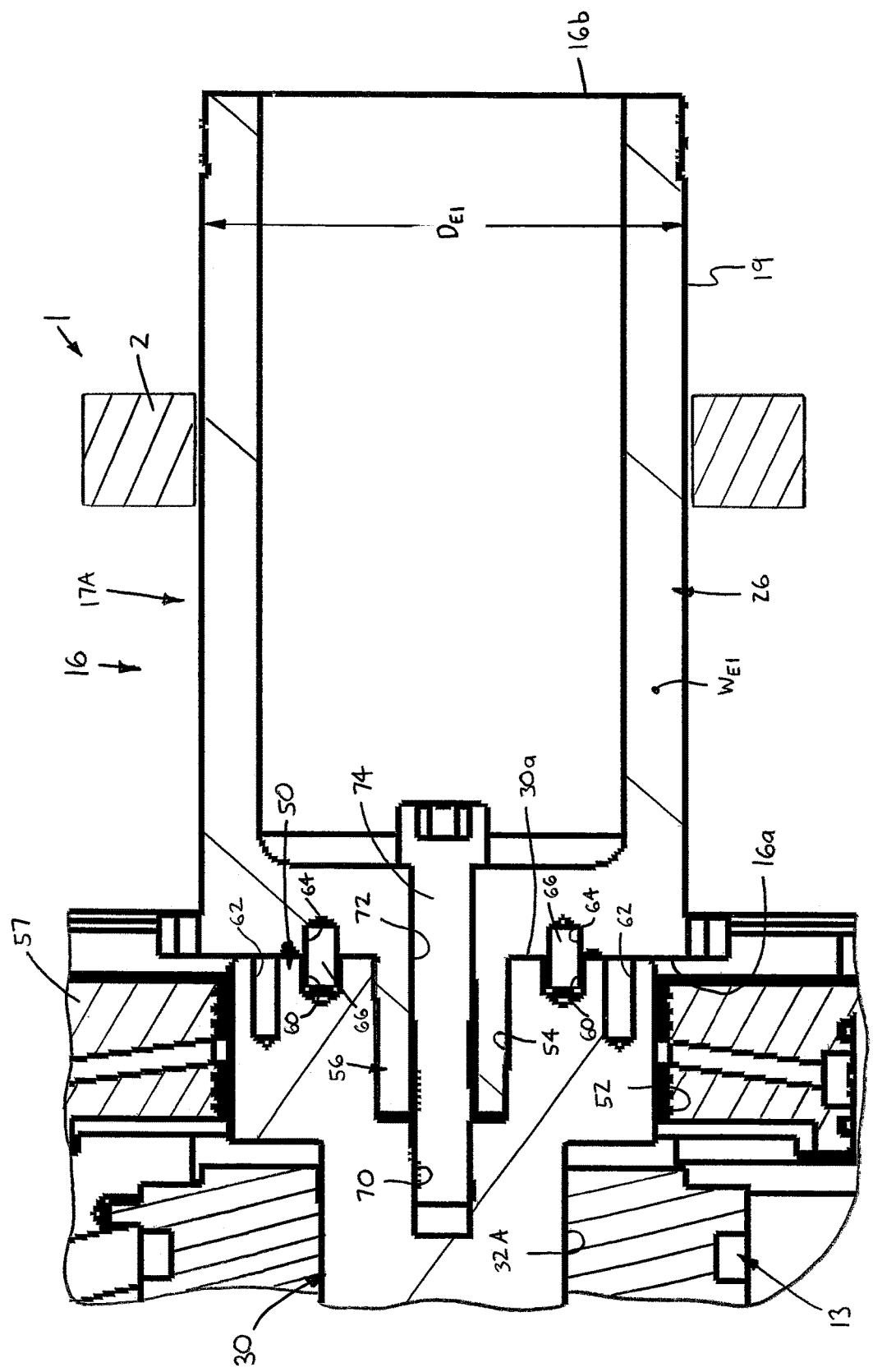
FIG. 5 is an enlarged view of an end portion of the test rig of FIG. 2, shown with a first exemplary test article.

Referring to FIGS. 5-10 and 12, the rod enlarged end portion 50 preferably further has a plurality of locator openings 60 and coupler openings 62 each extending axially inwardly from the first end 30a and spaced radially outwardly from the central opening 54. Similarly, the shaft extension first end 16a has a plurality of locator openings 64, and in certain constructions (not shown) a plurality of coupler openings, each spaced radially outwardly from the extension centerline $L_{CE}$. Each rod locator opening 60 is axially alignable with a separate one of the extension locator openings 64 such that locator pin 66 is insertable within each pair of openings 60, 64. Further, with shaft extension constructions having coupler openings, each rod coupler opening 62 is axially alignable with a separate one of the extension coupler openings such that threaded fastener is insertable through the aligned openings to removably couple the extension 16 with the rod 30. Furthermore, the rod end portion 50 preferably also has a threaded opening 70 extending axially inwardly from the central opening 54, and in certain constructions, the shaft extension 16 has a central opening extending 72 through the centering projection 56. As such, a threaded fastener 74 extends through the extension opening 72 and threadedly engages the rod threaded opening 70 to removably couple the shaft extension 16 with the rod 30, as shown in FIGS. 3, 5, 9.

Referring now to FIGS. 2, 3, 5 and 7-9, the particular shaft extension 16 incorporated into a shaft assembly 10 is preferably selected from at least a first shaft extension 17A (FIGS. 2, 5, 8 and 9) and a second shaft extension 17B (FIGS. 3 and 7), and most preferably from among numerous, different shaft extensions 17N (only two shown). As such, the test rig 11 is capable of testing articles 1 of various dimensional and axial sizes, differing types, e.g., circumferential seals (FIG. 5), axial face seals (FIGS. 3 and 7), bearings (not shown), couplers (not shown), and under differing conditions, e.g., pressurized, unpressurized, heavily lubricated, etc. Each one of the shaft extensions 17N has at least one outside diameter $D_E$, an axial length $L_E$ and a weight $W_E$, the particular values of which vary between the different shaft extensions 16.

Figure 7:
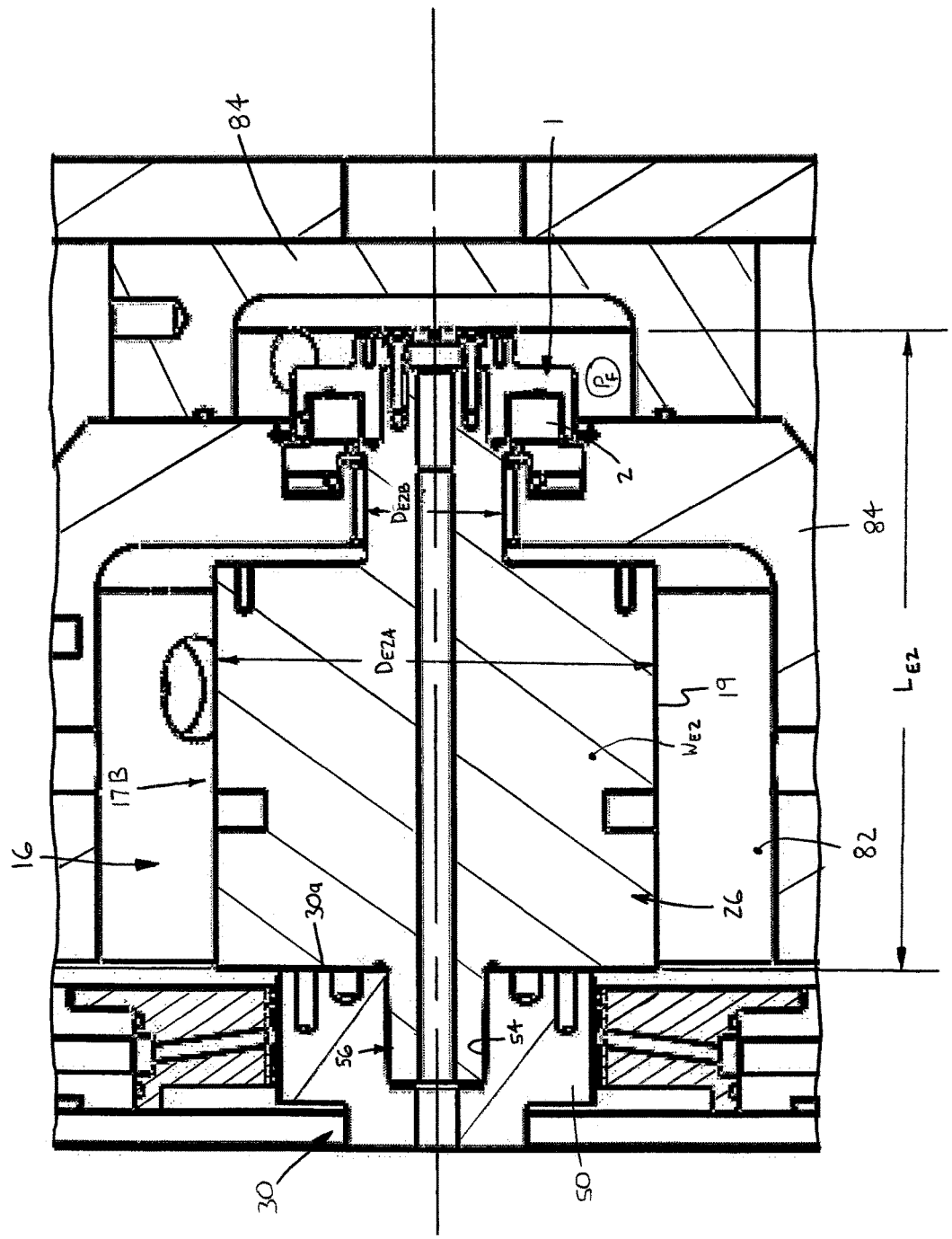
FIG. 7 is an enlarged view of a portion of FIG. 3.
Figure 8:
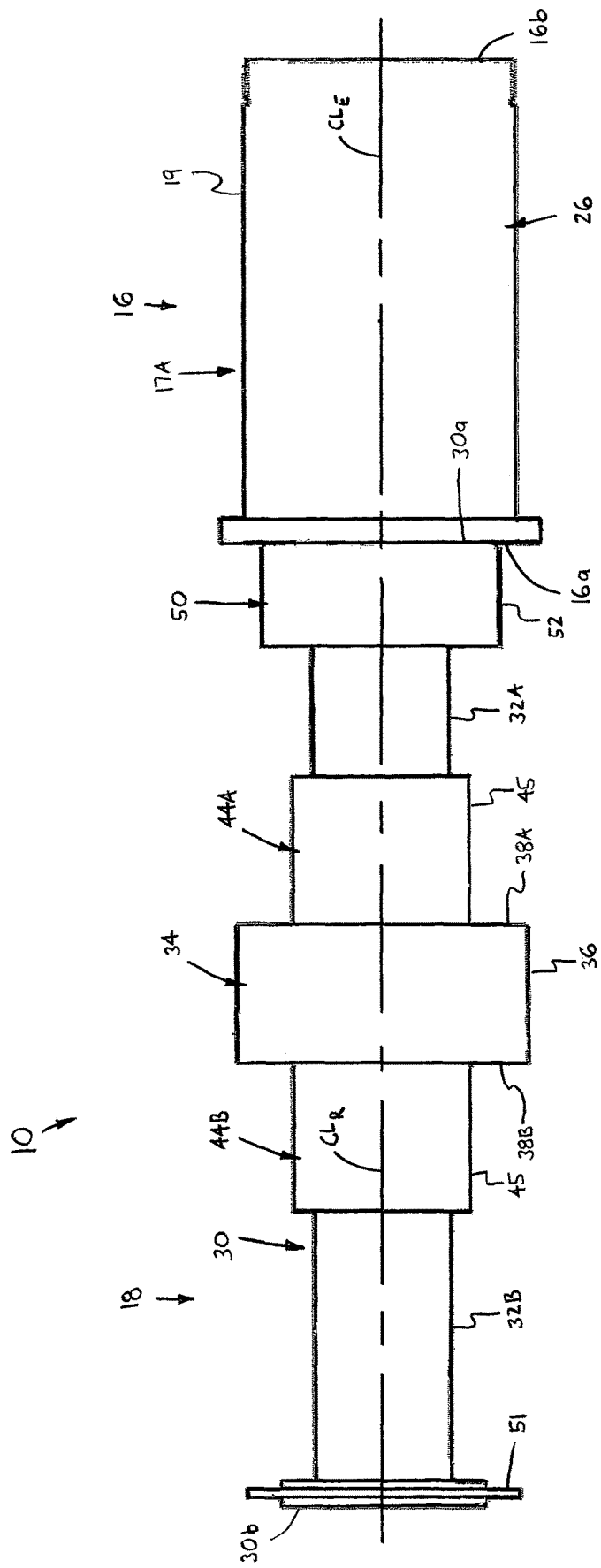
FIG. 8 is a side plan view of the shaft assembly with the first shaft extension.

For example, when comparing first and second shaft extensions 17A, 17B, the first shaft extension diameter $D_{E1}$ may be greater or lesser than the second shaft extension diameter $D_{E2}$, the first shaft extension axial length $L_{E1}$ may be greater or lesser than the second shaft extension axial length $L_{E2}$, or/and the first shaft extension weight $W_{E1}$ may be greater or lesser than the second shaft extension weight $W_{E2}$. Further, each shaft extension 16 may have a generally constant outside diameter $D_{E1}$, as shown in FIGS. 5, 8 and 9, or may have two or more sections of different outside diameters $D_{E2A}$, $D_{E2B}$, as indicated in FIG. 7. Further, any one of the particular shaft extensions 16 may be substantially solid (FIGS. 3 and 7) or generally tubular with an enclosed first axial end 16a (FIGS. 2, 5, 8 and 9).

In any case, the shaft assembly 10 is preferably constructed such that at least a substantial portion of the shaft extension 16 is disposed externally of the housing 12, which facilitates decoupling of the shaft extension 16 from the rod 30. Specifically, different test articles 1 may be tested under varying conditions merely by decoupling a particular shaft extension 16, used for a first test article 1, from the primary shaft 18, and then connecting another shaft extension 16 adapted for use with a second test article 2. As such, the test rig 11 preferably further includes an extension housing 80 removably connectable with the test rig housing 12 and having an interior chamber 82, the shaft extension 16 being disposed within the extension housing interior chamber 82 so as to be enclosed therein.

The extension housing 80 prevents contact with the extension 16 during testing and is also preferably configured to be pressurized, such that fluid pressure $P_F$ within the housing 84 is greater than ambient pressure, for example fifteen pounds per square inch gage (15 psig) and nine hundred (900) psig. Thereby, the test article 1 may be tested under relatively high-pressure conditions in addition to the high rotational speeds as described above. Further, the test rig 11 preferably includes a plurality of extension housings 80 having different diametrical or/and axial dimensions, and/or differing shapes and structures, and may include a single casing (not shown) or a plurality of casings 84 (FIGS. 3 and 7) to accommodate the different extension shafts 17N, test articles 1 and/or pressurization conditions.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as generally defined in the appended claims.

I claim:

1. A high-speed test rig for testing articles at rotational speeds between thirty thousand rotations per minute (30,000 rpm) and forty-two thousand two hundred twelve rotations per minute (42,212 rpm), each test article including a generally annular body, the test rig comprising:
a housing;
first and second bearings disposed within the housing and spaced apart along a central axis;
a shaft extension having a centerline, opposing first and second axial ends spaced apart along the centerline and an outer circumferential surface, the shaft extension being sized to receive the test article annular body about the extension outer surface; and
a primary shaft including a solid rod formed of a material having a specific modulus with a value greater than twenty million $m^2/s^2$, the rod having opposing first and second axial ends and first and second outer circumferential base surface sections, at least a portion of the first base surface section being disposed within the first bearing and at least a portion of the second base surface section being disposed within the second bearing such that the primary shaft is rotatable about the central axis, the rod first axial end being configured to couple the shaft extension first axial end with the primary shaft such that the extension centerline is coincident with the central axis and a cantilever beam is defined between the shaft extension second axial end and the first bearing, the rod second axial end being configured to couple a motor shaft with the primary shaft, the rod having an overall axial length between the rod first and second axial ends and the first and second base outer surface sections each having an outside diameter equal to or lesser than any other outer surface section of the rod, the rod being sized such that a ratio of the base surface section outside diameter to the rod axial length is between about 0.12 and 0.16.

2. The test rig as recited in claim 1 wherein the rod has a central collar portion with an outer circumferential surface and opposing first and second radial end surfaces, the first and second collar end surfaces being engageable by a separate one of two thrust bearings, the collar having an axial length between the two end surfaces and the collar outer surface section having an outside diameter, the collar being sized such that a ratio of the collar outside diameter to the base surface section outside diameter is between about 2.0 and about 2.3 and a ratio of the collar length to the rod overall length is between about 0.12 and about 0.16.

3. The test rig as recited in claim 2 further comprising first and second thrust bearings, each thrust bearing being operatively engageable with a separate one of the first and second collar ends surfaces so as to support axial loading on the rod.

4. The test rig as recited in claim 2 wherein the rod further includes first and second stepped portions each located between the collar portion and a separate one of the first and second base surface sections, each stepped portion having an axial length and an outer circumferential surface with an outside diameter, each stepped portion outside diameter being greater than the base surface section outside diameter and lesser than the collar portion outside diameter, each rod stepped portion being sized such that a ratio of the stepped portion length to the rod length is between about 0.13 and about 0.17 and a ratio of the stepped portion outside diameter to the base surface section outside diameter is between about 1.1 and about 1.5.

5. The test rig as recited in claim 4 wherein the rod has an enlarged end portion providing the first axial end, the enlarged end portion having an axial length and an outer circumferential surface with an outside diameter, the end portion being sized such that a ratio of the end portion outside diameter to the base surface section outside diameter is between about 1.6 and about 1.9 and a ratio of the end portion axial length to the rod overall length is between about 0.09 and about 0.13.

6. The test rig as recited in claim 1 wherein the shaft extension, the test article and any other components mounted on the extension have a combined weight of at least ten pounds (10 lbs.).

7. The test rig as recited in claim 6 wherein the combination of the primary shaft and the shaft extension has a bending critical speed greater than forty-eight thousand rotations per minute (48,000 rpm).

8. The test rig as recited in claim 6 wherein the combination of the primary shaft and the shaft extension bending critical speed is greater than fifty-five thousand rotations per minute (55,000 rpm).

9. The test rig as recited in claim 1 wherein:
the rod includes a tapered inner circumferential surface extending axially inwardly from the first axial end and centered about the rod centerline so as to define a central opening, the inner circumferential surface having a first inside diameter at the rod first axial end and a second inside diameter at an inner end of the inner surface, the inner surface tapering continuously between the first and second inside diameters so as to define a first taper angle;
the shaft extension has a tapered central projection extending axially outwardly from the extension first axial end, the projection having an inner end integrally formed with the shaft extension and having a first outside diameter and a second, free end with a second outside diameter, the projection outer surface tapering substantially continuously between the first and second diameters so as to define a second taper angle substantially equal to the first taper angle, the extension projection being disposeable within the rod opening so as to substantially center the shaft extension about the central axis.

10. The test rig as recited in claim 1 wherein:
the shaft extension is selected from at least a first shaft extension and a second shaft extension, each one of the first shaft extension and the second shaft extension having a diameter, an axial length and a weight; and
at least one of:
the first shaft extension diameter is greater than the second shaft extension diameter;
the first shaft extension axial length is greater than the second shaft extension axial length; and
the first shaft extension weight is greater than the second shaft extension weight.

11. The test rig as recited in claim 1 wherein at least a substantial portion of the shaft extension is disposed externally of the housing.

12. The test rig as recited in claim 11 further comprising an extension housing removably connectable with the test rig housing and having an interior chamber, the shaft extension being disposed within the extension housing interior chamber.

13. The test rig as recited in claim 1 wherein each one of the first and second bearings is a journal bearing including an annular metallic body having an inner circumferential surface and an annular Babbitt layer disposed on the metallic body inner surface.

14. The test rig as recited in claim 1 wherein the rod is formed of alloy steel or titanium.

15. The test rig as recited in claim 1 further comprising a motor coupled with the rod second axial end and configured to rotate the shaft assembly about the central axis.

16. A shaft assembly for a high-speed test rig for testing articles at rotational speeds between thirty thousand rotations per minute (30,000 rpm) and forty-three thousand rotations per minute (43,000 rpm), each test article including a generally annular body, the rig including a housing and first and second bearings disposed within the housing and spaced apart along a central axis, the shaft assembly comprising:
a shaft extension having a centerline, opposing first and second axial ends spaced apart along the centerline and an outer circumferential surface, the shaft extension being sized to receive the test annular body about the extension outer surface; and
a primary shaft including a solid rod having opposing first and second axial ends, a first base outer circumferential surface section disposed within the first bearing and a second base outer circumferential surface section disposed within the second bearing such that the primary shaft is rotatable about the central axis, a central collar portion with an outer circumferential surface and opposing first and second radial end surfaces, the first and second collar end surfaces being engageable by a separate one of two thrust bearings, the rod first axial end being configured to couple the shaft extension first axial end with the primary shaft such that the extension centerline is coincident with the central axis and a cantilever beam is defined between the shaft extension second axial end and the first bearing, the rod second axial end being configured to couple a motor shaft with the primary shaft;
wherein the rod has an overall axial length between the rod first and second axial ends, the first and second base outer surface sections each have an outside diameter equal to or lesser than any other outer surface section of the rod, the collar has an axial length between the two collar end surfaces, and the collar outer surface section has an outside diameter; and
wherein the rod is sized such that a ratio of the base surface section outside diameter to the rod axial length is between about 0.12 and 0.16, the collar is sized such that a ratio of the collar outside diameter to the base surface section outside diameter is between about 2.0 and about 2.3 and a ratio of the collar length to the rod overall length is between about 0.12 and about 0.16.

17. The shaft assembly as recited in claim 16 wherein the test rig further includes two thrust bearings and the rod collar end surfaces are each operatively engageable by a separate one of the two thrust bearings so as to support axial loading on the rod.

18. The shaft assembly as recited in claim 16 wherein the rod further includes first and second stepped portions each located between the collar portion and a separate one of the first and second base surface sections, each stepped portion having an axial length and an outer circumferential surface with an outside diameter, each stepped portion outside diameter being greater than the base surface section outside diameter and lesser than the collar portion outside diameter, each rod stepped portion being sized such that a ratio of the stepped portion length to the rod length is between about 0.13 and about 0.17 and a ratio of the stepped portion outside diameter to the base surface section outside diameter is between about 1.1 and about 1.5.

19. The shaft assembly as recited in claim 18 wherein the rod includes an enlarged end portion providing the first axial end, the enlarged end portion having an axial length and an outer circumferential surface with an outside diameter, the end portion being sized such that a ratio of the end portion outside diameter to the base surface section outside diameter is between about 1.6 and about 1.9 and a ratio of the end portion axial length to the rod overall length is between about 0.09 and about 0.13.

20. The shaft assembly as recited in claim 19 wherein the shaft extension, the test article and any other components mounted on the extension have a combined weight of at least ten pounds (10 lbs.).

\* \* \* \* \*